US006787265B2

(12) United States Patent
Phillips

(10) Patent No.: US 6,787,265 B2
(45) Date of Patent: Sep. 7, 2004

(54) POSITIVE AND NEGATIVE INTERACTIVE ELECTRODE FORMULATION FOR A ZINC-CONTAINING CELL HAVING AN ALKALINE ELECTROLYTE

(75) Inventor: Jeffrey Phillips, Santa Clara, CA (US)

(73) Assignee: PowerGenix Systems, Inc., Yukon (CA)

( * ) Notice: Subject to any disclaimer, the term of this patent is extended or adjusted under 35 U.S.C. 154(b) by 0 days.

(21) Appl. No.: 10/429,711

(22) Filed: May 6, 2003

(65) Prior Publication Data

US 2003/0190524 A1 Oct. 9, 2003

Related U.S. Application Data

(63) Continuation of application No. PCT/CA01/01717, filed on Nov. 7, 2001.

(30) Foreign Application Priority Data

Nov. 10, 2000 (CA) ............................................. 2325640

(51) Int. Cl.[7] ................................................. H01M 4/32
(52) U.S. Cl. ........................ 429/223; 429/231; 429/229; 429/207; 429/206; 429/232
(58) Field of Search ................................. 429/223, 231, 429/229, 207, 206, 232

(56) References Cited

U.S. PATENT DOCUMENTS

| 3,870,564 A | | 3/1975 | Takamura et al. | |
| 3,951,687 A | | 4/1976 | Takamura et al. | |
| 3,961,985 A | * | 6/1976 | Takamura et al. | .......... 429/223 |
| 4,017,665 A | | 4/1977 | Sandera et al. | |
| 5,215,836 A | | 6/1993 | Eisenberg | |
| 5,968,684 A | * | 10/1999 | Hayashi et al. | ............. 429/223 |
| 6,225,004 B1 | * | 5/2001 | Hayashi | ..................... 429/223 |

FOREIGN PATENT DOCUMENTS

JP 54-163324 * 12/1974

* cited by examiner

Primary Examiner—Laura Weiner
(74) Attorney, Agent, or Firm—Bever Weaver & Thomas, LLP

(57) ABSTRACT

A nickel-zinc galvanic cell is provided, having a pasted zinc oxide negative electrode, a pasted nickel oxide positive electrode, and an alkaline electrolyte. Chemical additives are placed in each of the negative and positive electrodes. The positive nickel hydroxide electrode contains a mixture of co-precipitated cobalt oxide in the range of 1% to 10%, and freely added, finely divided cobalt metal in the range of 1% to 5%, by weight. The negative zinc oxide electrode contains oxides other than the oxide of zinc, which have redox potentials which are negative of 0.73 volts. Also, the metal oxide additives to the negative zinc oxide electrode are such as to inhibit release of soluble cobalt from the nickel oxide negative electrode prior to a formation charge being applied to the electrochemical cell. The nickel-zinc cell contains 1% to 15% of the defined metal oxides, having a solubility less than $10^{-4}$M in the alkaline electrolyte.

3 Claims, No Drawings

POSITIVE AND NEGATIVE INTERACTIVE ELECTRODE FORMULATION FOR A ZINC-CONTAINING CELL HAVING AN ALKALINE ELECTROLYTE

This is a continuation of application No. PCT/CA01/01717, filed Nov. 7, 20001.

FIELD OF THE INVENTION

This invention relates to alkaline galvanic cells having zinc electrodes and an alkaline electrolyte. More particularly, the present invention relates to high energy density rechargeable cells having a zinc or zinc-based negative electrodes, an alkaline electrolyte, and positive electrodes which may be nickel, silver, air, or iron.

BACKGROUND OF THE INVENTION

The provision of rechargeable zinc batteries having alkaline electrolytes is well known. Leaving aside the question of zinc/manganese dioxide cells, which find dominance in commercial fields supplying cells (batteries) for use in flashlights, toys, low drainage devices such as electric clocks, and the like, there is also a very large market and requirement for high energy density, high capacity cells and batteries such as nickel-zinc, silver-zinc, and zinc-air batteries, as well as a recently introduced super iron-zinc battery. A requirement is, however, that such cells and batteries must be cycled many times through discharge/charge cycles; leading in turn to several further requirements. The first is that the capacity of the rechargeable cell should not diminish significantly over a number of cycles, there should be no significant shape change—particularly of the zinc electrode—and no significant dendrite formation. Most especially, newly developed high energy density rechargeable zinc cells should be free or substantially free of toxicity, so as to be environmentally benign. This means, in particularly, that a robust, long-lasting, rechargeable battery must be brought to the market which contains no cadmium, no lead, and no mercury.

In the following discussion, the terms "cell" and "battery" may be used interchangeably. Of course, it is recognized that a cell comprises two electrodes, one positive and one negative, and an electrolyte; and a battery may comprise a number of cells which are joined together in series, parallel, or series/parallel. In many batteries, of course, there are a plurality of negative and positive plates and a common electrolyte all contained in a single casing; and in some cases, the plates may be bipolar. In other batteries, there may be a plurality of self-contained cells, each having their own positive and negative electrodes and electrolyte. Moreover, cells and batteries may be cylindrical or rectangular, they may comprise flat plates or rolled plates, and they may have a relatively low voltage of one or two volts. Batteries may have a relatively high voltage, in the range of twelve to sixteen volts, sometimes much higher. The present invention applies to any of the above considerations in respect of cells and batteries, as it relates to the structure of the electrodes.

Batteries in keeping with the present invention will find particular utility in traction markets, being used on scooters and bicycles, as well as in hybrid automobiles, and in the power tool market. In such markets, there is a very great necessity for sealed battery systems, which have high energy density and, therefore, relatively low weight per amp-hour unit capacity, as well as low cost per amp-hour unit capacity. Moreover, batteries in keeping with the present invention will provide high amp-hour capacity per unit volume.

A particular feature of the present invention is that long life, rechargeable zinc electrodes may be supplied which can be manufactured using equipment that is presently used for nickel cadmium or nickel metal-hydride production. Typically, electrodes which embody the present invention are pasted on a high conductivity, low resistance matrix or carrier, which might conveniently be manufactured from copper and/or suitable alloys thereof.

In order to minimize shape change and dendrite growth, and to provide a stable construction so as to achieve prolonged cycle life, high power over the life of the battery, and maximum energy density, careful choice must be made of the combination of the zinc electrode and the electrolyte for the battery.

Typically, batteries in keeping with the present invention employ a buffered borate electrolyte which is particularly such as that which is taught in EISENBERG U.S. Pat. No. 5,215,836, issued Jun. 1, 1993. That patent teaches alkaline galvanic cells having an electrolyte composition which comprises a solution of a salt formed by reacting boric acid (or, alternatively, phosphoric acid or arsenic acid) with an alkali or earth alkali hydroxide which is present in a sufficient amount to produce a stoichiometric excess of hydroxide to acid in the range of 2.5 to 11.0 equivalents per liter. As well, a soluble alkali or earth or earth alkali fluoride is present, in an amount corresponding to a concentration range of 0.01 to 1.0 equivalents per liter of total solution.

By suitable zinc formulation, as taught hereafter, together with use of the buffered borate electrolyte, degradation mechanisms that operate during cycling are inhibited.

DESCRIPTION OF THE PRIOR ART

The performance of rechargeable zinc electrodes in alkaline electrolytes has been the subject of many studies that encompass the zinc electrode composition and the interaction with the electrolyte. A performance inhibiting disfigurement of the zinc electrode occurs as cycling progresses. The most obvious effect is a lower than acceptable amp-hour capacity delivered at useable voltages. This tendency has been arrested by a number of approaches. The combination of more dilute potassium hydroxide electrolyte together with the addition of calcium hydroxide to the Zinc electrode appears to be particularly effective (U.S. Pat. No. 4,358,517 issued Nov. 9, 1982 to JONES). Alternate approaches have used buffered electrolytes with and without fluoride additions that have also resulted in increased zinc electrode life span. Noteworthy among these approaches is that described in U.S. Pat. No. 5,453,336 issued Sep. 26, 1995 to ADLER et al. which teaches a mixture of alkaline electrolyte (2–12M) combined with a carbonate of 0.5–4M and a fluoride of 0.5–4M is particularly effective. U.S. Pat. No. 4,273,841 issued Jun. 16, 1981 to CARLSON describes another mixture that employs 5–10% hydroxide, 10–20% phosphate and 5–15% fluoride. EISENBERG describes two electrolyte formulations in U.S. Pat. No. 4,224,391 issued Sep. 23, 1980 and U.S. Pat. No. 5,215,836 issued Jun. 1, 1993. Both employ mixtures of potassium hydroxide and boric, phosphoric or arsenic acid. However the latter patent describes advantages of alkali fluorides in the range of 0.01 to 1M. This should be implemented in combination with a more alkaline electrolyte.

Electrode additions of numerous oxide additives have been investigated and proved to be beneficial (U.S. Pat. No. 5,556,720 issued Sep. 17, 1996 to CHARKEY and U.S. Pat. No. 4,084,047 issued Apr. 11, 1978 to HIMY et al.). Some oxides are claimed to result in a conductive metal matrix that enhances electrode conductivity; others may result in the formation of beneficial alloys and a reduction in hydrogen evolution. Zinc fluoride and zinc titanate (U.S. Pat. No. 4,304,828 issued Dec. 8, 1981 to VAIDYANATHAN) and the direct additions of alkali fluoride to the zinc electrode have also been found beneficial (U.S. Pat. No. 4,017,665 issued Apr. 12, 1977 to SANDERA et al.).

It should also be noted that lead, cadmium, and mercury oxides are particularly favoured as electrode enhancement additives. However, these oxides impart a toxicity to the electrode that is undesirable—and, in some instances, unacceptable.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

It has not previously been recognized that there is considerable interaction between the positive and the negative electrodes—particularly in a cell having an alkaline electrolyte. Such interaction can lead to deleterious contamination of the negative electrode, with resulting shortened cycle life. In particular, the cobalt materials that are commonly added to a nickel positive electrode often become soluble; and this permits them to diffuse to the negative electrode where they are reduced. This, in turn, increases the hydrogen evolution tendency of the negative electrode throughout the life of the cell. The result of the increased decomposition of the electrolyte is that the cell will dry out prematurely. Even more dramatically, these compounds can cause soft short circuits in the cell, that prematurely drain the battery.

It is common practice to add cobalt oxides to a nickel hydroxide paste to affect additional conductivity between the active material particles (see U.S. Pat. Nos. 5,759,718 & 5,489,314, for example). As the CoO material slowly dissolves and is oxidized to a conductive insoluble CoOOH, a conductive network is set up in situ. In some cases, external chemical oxidants are used to promote the reaction (see U.S. Pat. No. 5,489,314). The tendency for the leaching cobalt materials to generate short circuits was referred to in U.S. Pat. No. 5,435,055. The answer appeared to be to oxidize the electrode to an extent equal to 5% of the cell rated capacity. However, it was not recognized that the problem is not primarily associated with cobalt metal inclusion, but rather it comes as a consequence of the solubility of the cobalt oxide.

It has been observed that in common formulations of the positive nickel hydroxide electrode, a blue coloration signifying soluble cobalt species occurs within a few hours after the addition of electrolyte. This "discoloration of the electrolyte" has been found to be a prediction of heavier gassing rates of the zinc electrode in nickel-zinc cells. In particular, after being subjected to this phenomenon, the zinc electrode appears to have a much less light grey coloration, and it has a less uniform color. Also, the zinc electrode is more likely to release hydrogen gas.

It has been found that the cobalt oxide additives to the nickel hydroxide active material are the principal cause of the problem. It has been determined that co-precipitated cobalt oxide that is trapped within the nickel hydroxide matrix is not a problem. This material exhibits very little tendency to dissolve in the electrolyte in the normal operating voltage range of the cell. The elimination of freely added cobalt oxides, and the substitution of cobalt powder alone in the nickel electrode, significantly reduces the release of the cobalt ions into the electrolyte solution. This not only can reduce gassing, but also can reduce the risk of soft short circuits within the cell. More surprisingly, there appears to be a significant effect of the additives normally associated with the performance of the zinc electrode.

Significantly, the presence of lead oxide in the negative electrode promotes the release of cobalt, and the presence of bismuth oxide is inconsequential. The interaction of the lead ions and the cobalt ions is not fully understood, but it is suspected that the combination of higher solubility in the electrolyte and an appropriately more positive redox potential to the cobalt couple, may be responsible. Consequently, only those zinc electrode additives that exhibit either low solubility in the electrolyte, or redox potentials negative of the (−0.73V) associated with the cobalt/cobalt oxide couple, may be used effectively.

Other modifications and alterations may be used in the design and manufacture of the apparatus of the present invention without departing from the spirit and scope of the accompanying claims.

What is claimed is:

1. A nickel-zinc galvanic cell which has a pasted zinc oxide negative electrode, a pasted nickel oxide positive electrode, and an alkaline electrolyte, wherein chemical additives are placed in each of said negative and positive electrodes;

wherein said positive nickel hydroxide electrode contains a mixture of co-precipitated cobalt oxide in the range of 1% to 10%, and freely added, finely divided cobalt metal in the range of 1% to 5%, by weight; and wherein said negative electrode contains oxides other than the oxide of zinc which have redox potentials which are negative of −0.73 volts.

2. The nickel-zinc cell of claim 1, wherein the metal oxide additives to the negative zinc oxide electrode are such as to inhibit release of soluble cobalt from the nickel oxide negative electrode prior to a formation charge being applied to the electrochemical cell.

3. The nickel-zinc cell of claim 1 or 2, wherein the negative zinc oxide electrode contains 1% to 15% of the defined metal oxides, having a solubility less than $10^{-4}$M in the alkaline electrolyte.

* * * * *